(12) United States Patent
Worrall et al.

(10) Patent No.: US 8,646,695 B2
(45) Date of Patent: Feb. 11, 2014

(54) COMBINED HF AND UHF RFID DEVICE

(75) Inventors: David Worrall, Orlando, FL (US);
Ernest Martin, Orlando, FL (US);
Robert Oberle, Macungie, PA (US);
Tvrtko Barbaric, San Jose, CA (US);
Vlatko Kolaric, Atlanta, GA (US);
Giuliano Manzi, Graz (AT)

(73) Assignee: Disney Enterprises, Inc., Burbank, CA (US)

( * ) Notice: Subject to any disclaimer, the term of this patent is extended or adjusted under 35 U.S.C. 154(b) by 9 days.

(21) Appl. No.: 13/252,031

(22) Filed: Oct. 3, 2011

(65) Prior Publication Data
US 2012/0111950 A1 May 10, 2012

Related U.S. Application Data

(60) Provisional application No. 61/389,124, filed on Oct. 1, 2010.

(51) Int. Cl.
*G06K 19/02* (2006.01)
(52) U.S. Cl.
USPC .......................................... 235/488; 235/492

(58) Field of Classification Search
USPC .................... 235/488, 492; 340/572.7, 572.8; 343/728
See application file for complete search history.

(56) References Cited

U.S. PATENT DOCUMENTS

| | | | |
|---|---|---|---|
| 6,476,775 B1 | 11/2002 | Oberle | |
| 7,315,248 B2 * | 1/2008 | Egbert | 340/572.7 |
| 8,093,996 B2 * | 1/2012 | Heurtier | 340/407.2 |
| 2009/0058731 A1 * | 3/2009 | Geary et al. | 343/700 MS |
| 2009/0134226 A1 * | 5/2009 | Stobbe | 235/462.44 |
| 2009/0295645 A1 * | 12/2009 | Campero et al. | 343/700 MS |
| 2009/0303050 A1 * | 12/2009 | Choi | 340/572.7 |
| 2011/0121082 A1 * | 5/2011 | Phaneuf | 235/492 |
| 2012/0056719 A1 * | 3/2012 | Krishna et al. | 340/10.1 |

\* cited by examiner

*Primary Examiner* — Ahshik Kim
(74) *Attorney, Agent, or Firm* — Patterson & Sheridan, LLP

(57) ABSTRACT

A wearable RFID device is configured with a geometry and materials that allow an HF RFID system and a UHF RFID system to operate in close proximity to a human body and to each other with minimal impact on performance. An RFID device may have a three-dimensional, multi-planar UHF antenna incorporated into a dielectric core with an HF antenna, or a single-plane UHF antenna separated from an HF antenna by a rigid spacer. A conductive metal backplane is disposed adjacent the wearable RFID device to improve antenna performance when disposed in close proximity to an absorbing body, such as a human being.

19 Claims, 12 Drawing Sheets ial patent# COMBINED HF AND UHF RFID DEVICE

CROSS-REFERENCE TO RELATED APPLICATIONS

This application claims priority to U.S. provisional patent application Ser. No. 61/389,124, filed on Oct. 1, 2010 and is hereby incorporated herein by reference.

BACKGROUND OF THE INVENTION

1. Field of the Invention

The present invention relates, in general, to methods and systems for radio frequency identification (RFID) tags, and, more particularly, to systems and methods for providing multiple diverse band antennas in an integrated module.

2. Description of the Related Art

Radio Frequency identification (RFID) is gaining popularity in a variety of manufacturing and service applications. In passive RFID applications, an RFID reader transmits a modulated radio frequency (RF) signal to the RFID tag. Passive RFID tags comprise an antenna that receives power transmitted from the reader and couples that power to be used by on-tag circuitry. In a typical implementation, the on-tag circuitry modulates the input impedance coupled to the antenna between strongly matched and strongly mismatched states which can be detected by the reader to communicate data between the reader and the tag.

RFID has a number of standard frequency ranges, each of which offer varying performance characteristics. For example, high frequency (HF) operated in a 10-15 MHz range while ultra high frequency (UHF) operates in a 850-950 MHz range. In the HF frequency range, tags are primarily responsive to the near-field magnetic component of an electromagnetic emission from the reader. Because near-field communication is limited to a few inches around a reader there is an inherent security benefit to HF RFID operations. In the UHF frequency range, tags are primarily responsive to far-field electric field components. Electric fields travel farther in air than magnetic fields and so are useful to read tags at a greater distance from the reader, but are more sensitive to interference from conductive obstacles, such as metal and high water content obstacles such as people, animals and, to a lesser extent foliage, humidity, and fog that will absorb the electric field.

In large part RFID tags support a single frequency band which forces the user to select between either HF or UHF operation. While this is acceptable for many product identification type applications, it is constraining for RFID applications in service industries where both near-field and far-field communication is desired. HF and UHF antenna designs are significantly different, which has made packaging them in a single device uncommon. HF tags often use a printed loop antenna that is made with as large a diameter as practical for the application to improve the capture of magnetic energy. UHF designs may use patch antennas, microstrip antennas, inverted-F antennas or other types. It is generally desired to increase the surface area of the antenna so as to increase the magnitude of the captured electric field.

Robust wearable RFID tags present further mechanical and electrical challenges. Many RFID tag designs for product tracking, for example, are intended for short term or disposable applications that require modest durability. In service industry applications, it may be desirable to have an RFID tag last for days or even years. Moreover, wearable RFID tags that are worn as a part of clothing or an item of jewelry are desired but create form factor and mechanical flexibility challenges.

SUMMARY

The present invention addresses the above problems by providing methods and systems for providing radio frequency identification (RFID) tags, and, more particularly, to systems and methods for providing multiple diverse band antennas in an integrated module.

In some embodiments, an RFID device has a three-dimensional folded antenna formed by a first conductive layer in a first plane and a second conductive layer in a second plane, where the first and second layers are separated by a dielectric and coupled near one edge by a conductive bridging component. A magnetic absorbing material layer is formed on the three-dimensional folded antenna and an HF antenna structure is formed on the magnetic absorbing material layer. HF RFID circuitry is coupled to the HF antenna structure. The bridging component may include a wrap around conductor and/or vias bridging the thickness of the dielectric layer and is formed on the magnetic absorbing layer and extending around or through the dielectric layer to the lower surface. UHF RFID circuitry is coupled to the UHF feed structure. Impedance matching may be provided by patterned structures in either the first or second layers.

In other embodiments, an RFID assembly is configured with a geometry and materials selected to facilitate high-volume manufacture. In one such embodiment, an RFID assembly has a layered configuration, in which a UHF antenna formed on one layer is separated from an HF antenna by a rigid spacer. In another such embodiment, an RFID assembly includes an HF antenna ring and a multi-layered UHF antenna incorporated into a high-dielectric ceramic core. The high-dielectric ceramic core is formed from multiple high-dielectric ceramic layers, where the HF antenna ring is formed on one surface of the high-dielectric ceramic core and the UHF antenna is formed on multiple layers of the high-dielectric ceramic core.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one example embodiment may be incorporated in other example embodiments without further recitation.

DETAILED DESCRIPTION OF EXEMPLARY EMBODIMENTS

Implementations of the present invention generally involve a robust, wearable RFID device that can be embodied in a wrist band in specific implementations. However, the present invention is readily adapted to a wide variety of form factors, including forms that are wearable and those that can be affixed to packaging and articles as are conventional RFID tags. Embodiments of the present invention include a three-dimensional antenna structure that provides improved surface area and length as is particularly useful for UHF applications and far-field detection where larger antenna structures prove a benefit. In other embodiments, the present invention involves structures and techniques for merging the three dimensional antenna with planar two-dimensional antenna structures in a manner that allows the diverse antennas to support operation in diverse frequency bands. In particular implementations, the invention includes a planar loop antenna for operation with HF bands integrated into a single module with a three dimensional antenna for operation with UHF bands.

Figure 1:
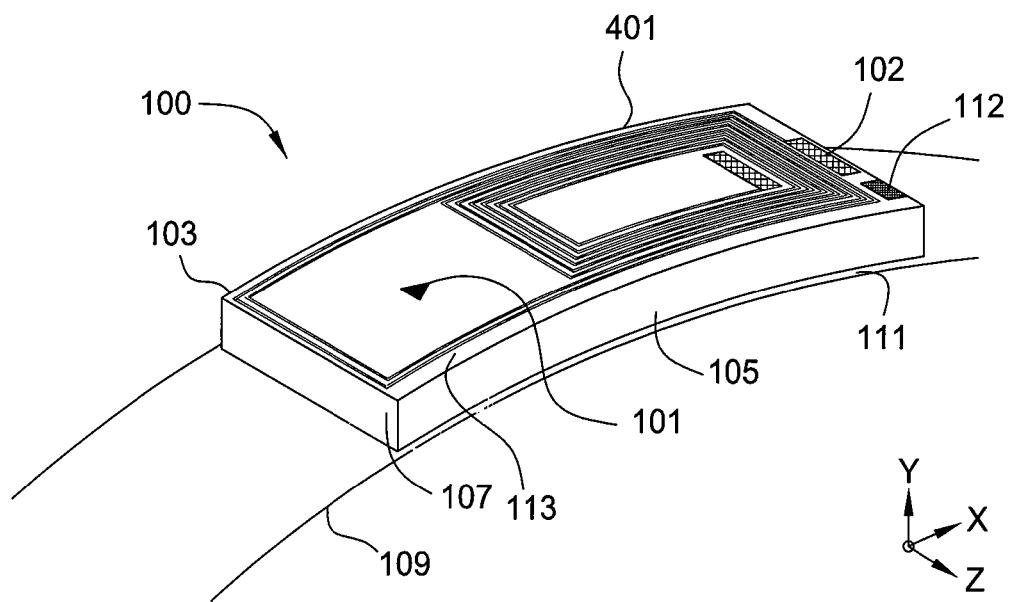
FIG. 1 shows a perspective view of an RFID module in accordance with an embodiment of present invention at a late stage of production prior to overmolding with a material to from a wearable article.

FIG. 1 shows a perspective view of an RFID module in accordance with an embodiment of present invention at a late stage of production prior to overmolding with a material to form a wearable article. The embodiment illustrated in FIG. 1 comprises an RFID assembly 100 having an HF RFID chip 112 such as a MIFARE technology implementation offered by NXP Semiconductors. HF RFID chip 112 is coupled at, for example, pads 102, to an HF loop antenna structure 401 formed, for example, by patterned copper traces in proximity to a peripheral portion of the upper surface shown in FIG. 1. For purposes of scale, in a particular implementation the assembly shown in FIG. 1 is about 30-40 mm in the longest direction, 15-20 mm in the shorter direction, and on the order of 3 mm thickness although these dimensions can be varied to meet the needs of a particular application. The HF RFID technology can take a variety of forms and any available planar technology may be used to form the HF implementation shown in FIG. 1.

HF RFID chip 112 and HF RFID antenna may be configured for any HF frequency in use in the art, but in some embodiments may be selected to optimize the maximum effective range of the HF RFID technology in RFID assembly 100. Careful selection of the maximum effective range of the HF RFID technology in RFID assembly 100 is desirable when HF RFID technology is used for transactions in which secure information is passed between a reader and HF RFID chip 112, and HF RFID technology is well-suited for such scenarios. Specifically, the range of an HF RFID assembly incorporated in RFID assembly 100 can be selected to be 10 cm or typically less, e.g. only 3 or 4 cm. Such short range ensures that a deliberate gesture on the part of the wearer or user of RFID assembly 100 is required to initiate or confirm transaction associated with RFID assembly 100.

Figure 4:
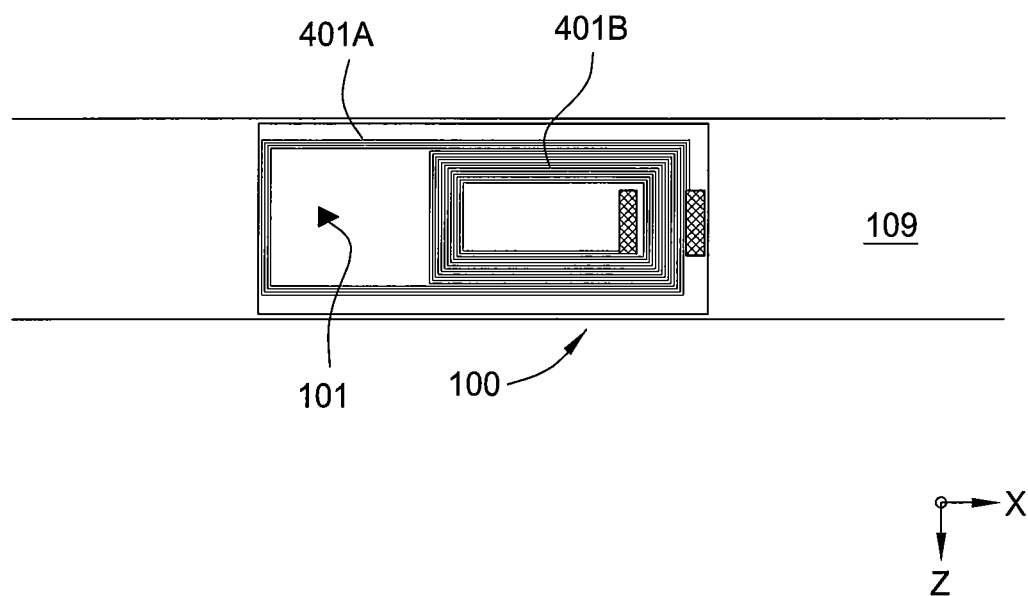
FIG. 4 shows a plan view of an upper surface of an RFID module in accordance with the present invention showing an exemplary high frequency (HF) antenna structure and general positioning of some ultra high frequency (UHF) components.
Figure 7:
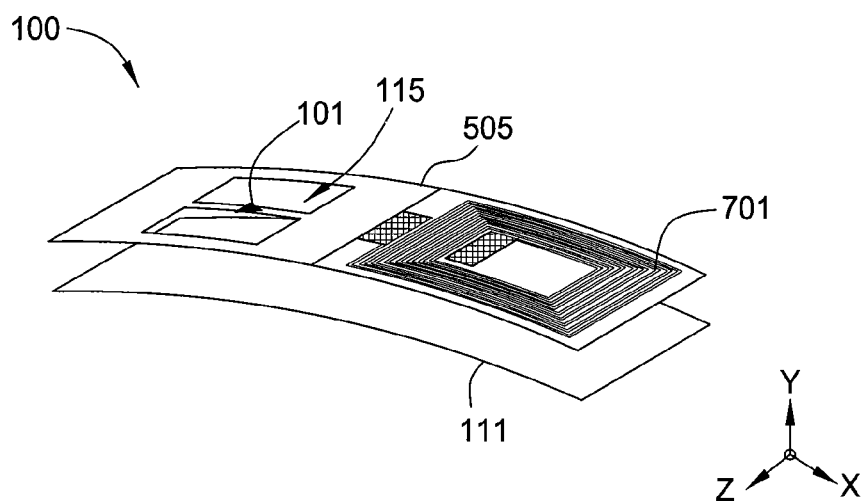
FIG. 7 shows a perspective view of a curved implementation with both UHF and HF antenna structures visible with a dielectric layer in phantom for purposes of illustration.

A planar view of the HF antenna implementation shown in FIG. 1 is shown also in FIG. 4. In the implementation of FIG. 4, the HF loop antenna structure 401 loops about the entire periphery of the RFID assembly 100 and is patterned to leave an open space free of loops in a portion of the antenna structure. UHF chip 101 is located in the open loop-free portion to lessen interference between the UHF and HF portions of RFID assembly 100. By comparison, an alternative HF layout is shown in FIG. 7, where HF loop antenna structure 401 is patterned on only one side (e.g., the right side in FIG. 7), to further electrically separate the HF and UHF operations.

A UHF chip 101 in FIG. 1 is placed at a location on the upper surface away from the loop antenna structure. Although the general location of UHF chip 101 is shown in FIG. 1, an upper metallization layer 505 (visible in FIGS. 5-8) is patterned to form an upper UHF antenna element 113 and impedance matching elements (not shown in FIG. 1). The general location of UHF chip 101 is shown in FIG. 1, however, it should be understood that the UHF chip 101 can be located at various positions so long as it is electrically coupled to the UHF antenna structure in a manner that is suitable for a particular application. This may include being located on a lower UHF antenna layer 111 or even on a wraparound conductor portion 107. Although these alternatives will cause some complexity in manufacturing they may also provide operational characteristics that are advantageous in some applications. Generally, the portions of the UHF antenna structure closest to the UHF chip 101 will receive more power in operation and will affect radiation field shape. Lower UHF antenna layer 111 of the UHF antenna is placed on a lower portion of RFID assembly 100 and is coupled to UHF chip 101 by the conductive wraparound 107 or by conductive via structures 507 in the embodiments of FIGS. 5-11.

Magnetic absorbing layer 103 isolates UHF antenna from HF magnetic fields that may cause interference if collected by UHF antenna. Magnetic absorbing layer 103 comprises a thin film or thick film ferrite or any suitable material that absorbs sufficient magnetic energy to enable reliable UHF antenna performance in a particular application.

Dielectric 105 comprises a material with a relatively high dielectric constant such as printed circuit board (PCB) or ceramic. Dielectric 105 is sufficiently thick to reduce parasitic coupling between structures on the upper surface of dielectric 105 (e.g., upper UHF antenna structures) and structures on the lower surface of dielectric 105 (e.g., lower UHF antenna layer 111). In this way, the dielectric 105 increases the electrical length of the UHF antenna, which is the sum of the length of the upper UHF component and the lower UHF component. In the particular embodiment shown in FIG. 1, a conductive metal backplane 109 that acts as a reflective shield is provided to improve performance, particularly of the UHF antenna. Specifically, the conductive backplane 109 reflects electric field energy and improves variance related to placing the wearable RFID assembly 100 in close proximity to an absorbing body such as an appendage of a human being.

Figure 2:
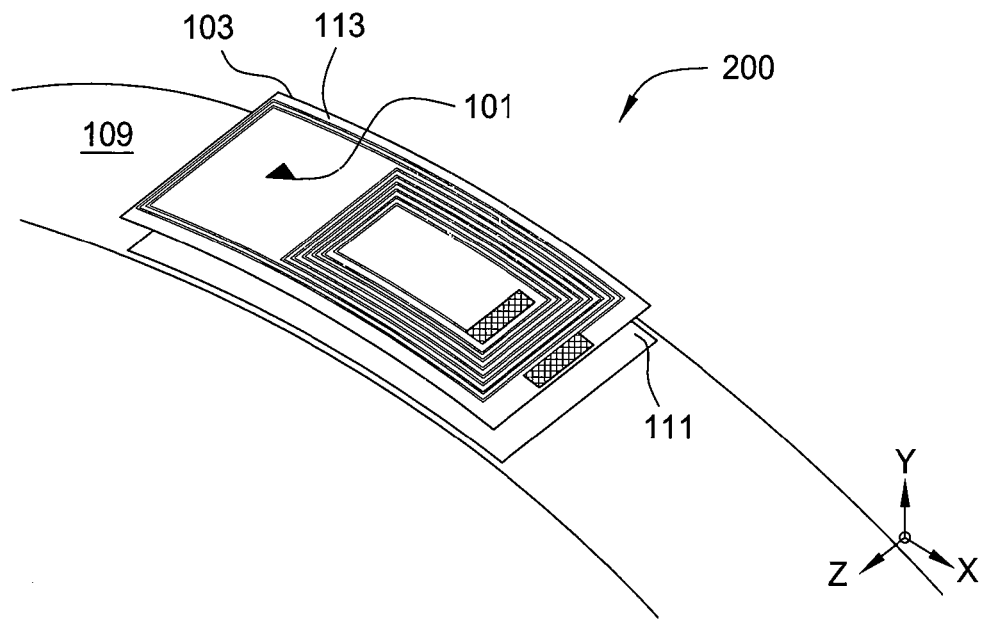
FIG. 2 shows a perspective view of an alternative embodiment RFID module in a similar state as shown in FIG. 1 with a dielectric separation layer in phantom to make components in a lower layer visible.

The upper UHF antenna component and lower UHF antenna component are bridged by bypass conductor 107 in FIG. 1 and by conductive vias in FIG. 2. A combination of bypass metal and vias may be used as well. The conductive vias are not visible in FIG. 2, but are better illustrated in FIG. 6.

Figure 3:
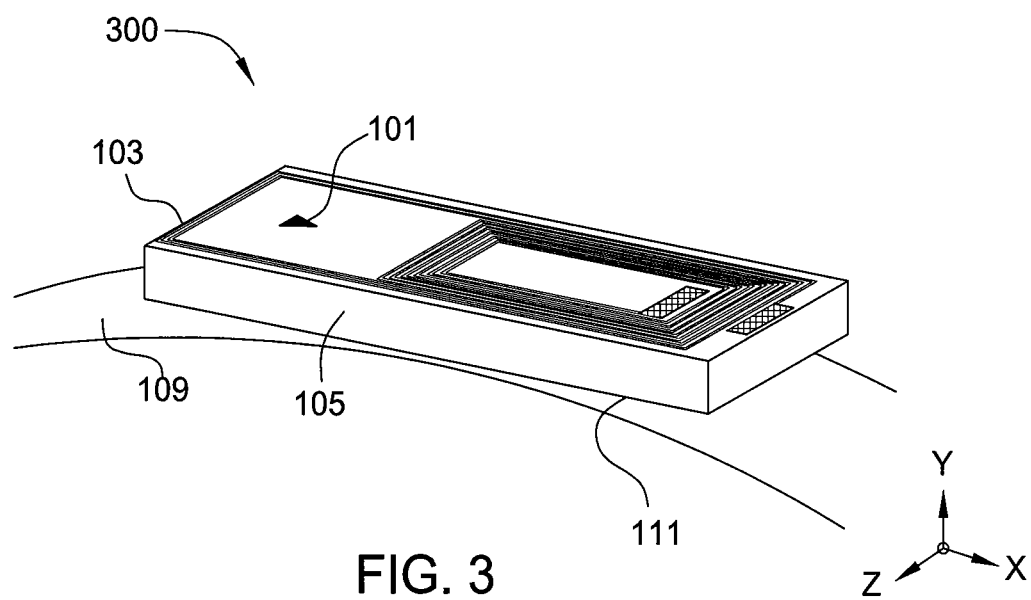
FIG. 3 shows another alternative embodiment comprising a substantially Hat RFID module in accordance with the present invention.

FIG. 3 shows an alternative implementation in which an RFID tag module 300 is substantially planar or flat in contrast with the curved implementations shown in FIG. 1 and FIG. 2. The flat implementation of FIG. 3 may simplify manufacturing or otherwise be more appropriate for particular applications. Other structures shown in FIG. 3 are generally similar to the above description of FIG. 1 and FIG. 2.

Figure 11:
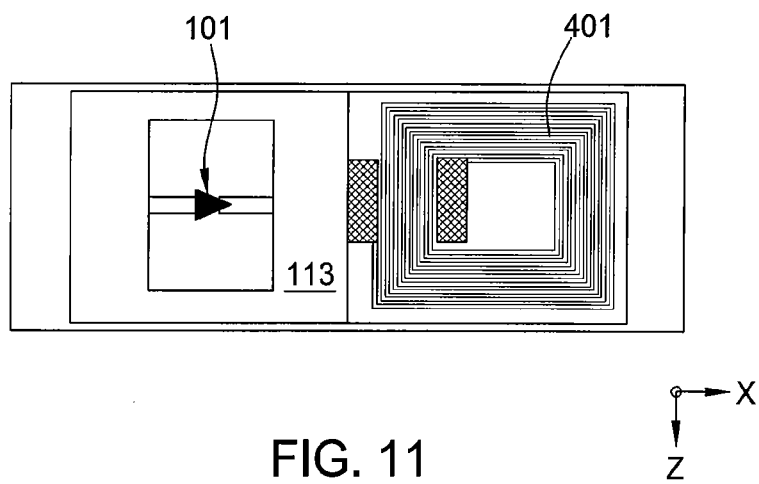
FIG. 11 is a plan view of a module in accordance with the present invention.

FIG. 4 and FIG. 11 shows top-down plan views of exemplary implementations of HF loop antennas compatible with the UHF antenna structures in accordance with the present invention. In the embodiment of FIG. 4, the outermost loops 401A of HF loop antenna structure 401 are formed to extend about the entire periphery of the top surface of RFID assembly 100. Inner loops 401B are abbreviated as shown to leave an open space for the location of UHF chip 101. In the embodiment of FIG. 11, HF loop antenna structure 401 is configured with antenna loops placed on only a portion of the surface of RFID assembly 100 such as the right-hand side in FIG. 11. This placement shown in FIG. 11 inhibits interaction between UHF antenna elements by lessening or eliminating overlap between the HF antenna structures and UHF antenna structures.

Figure 5:
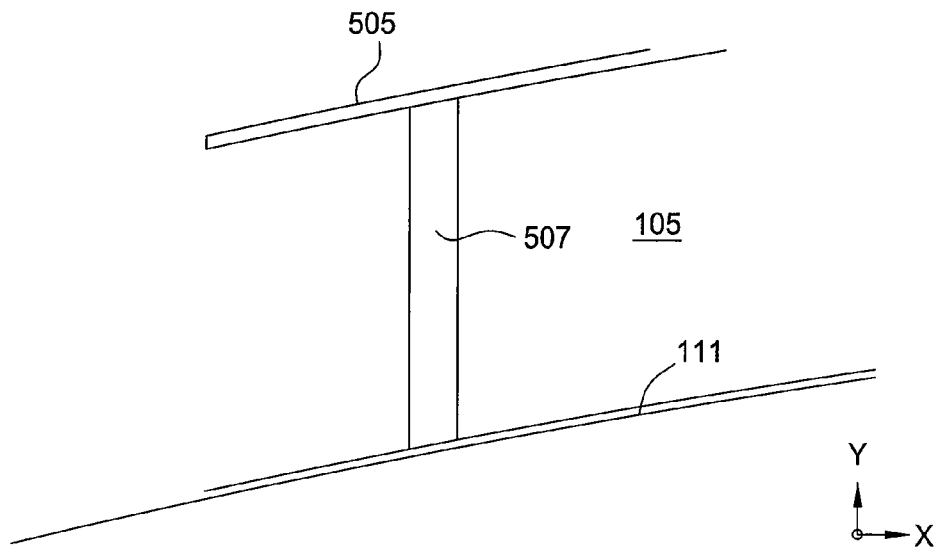
FIG. 5 shows a via structure used as one alternative for coupling selected portions of the upper antenna structure shown in FIG. 2 with a lower antenna component.
Figure 6:
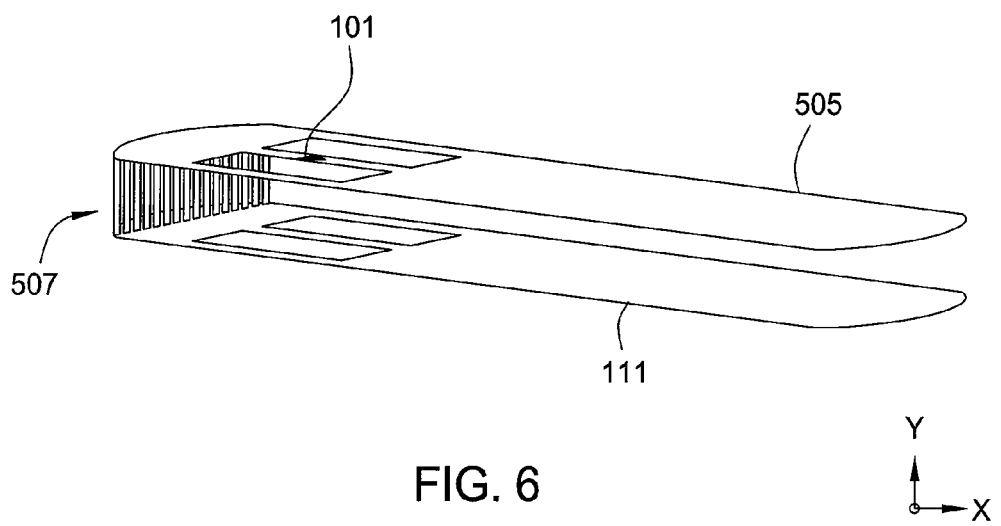
FIG. 6 shows a perspective view of selected portions that form a UHF antenna in accordance with the present invention with a dielectric layer in phantom for purposes of illustration.

An alternative to a wraparound conductor 107 is shown in FIG. 5. In this alternative, conductive bridging between the upper surface of dielectric 105 and the lower surface of dielectric 105 is provided by one or more conductive via structures 507. Via structure 507 may include low-resistance conductive vias or in some cases more complex coaxial feed structures coupling UHF signal from UHF chip 101 to the UHF antenna structure. As seen in FIG. 6, vias 507 are generally located at one side (e.g., a narrower side) of the three dimensional antenna structure such that the overall length of the antenna structure is additive. Any number of vias 507 may be used to meet the needs of a particular application. Vias 507 may be uniformly space or they may be non-uniformly space to affect power distribution between upper and lower UHF antenna elements and thereby affect field shape. As shown in FIG. 6, RFID assembly 100 may be formed as a substantially planar element rather than as a subtly curved structure shown in previous figures. The construction technology is substantially similar although in some applications a substantially planar implementation may be less expensive or more suitable for the end-user environment.

Figure 8:
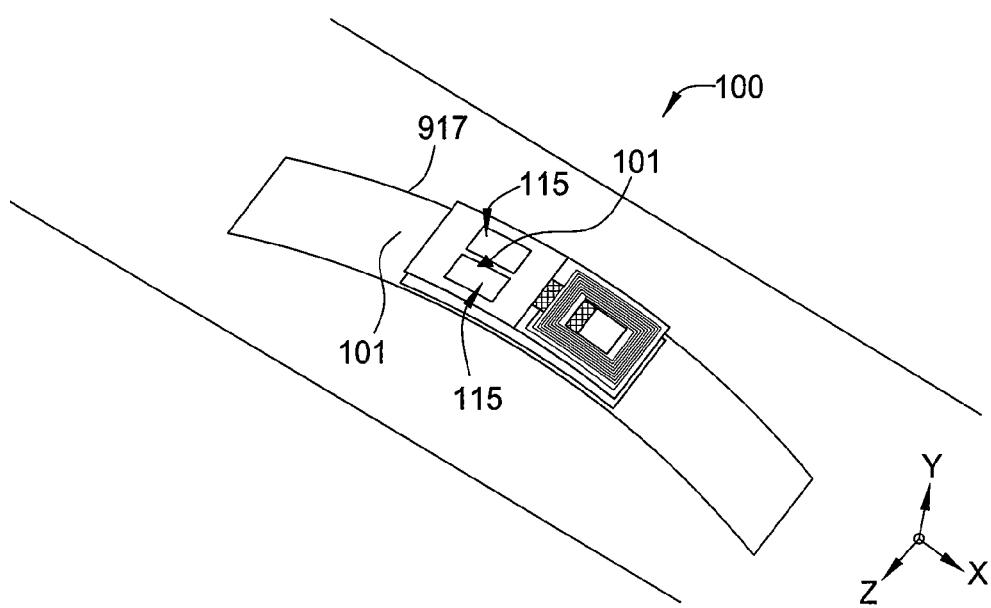
FIG. 8 shows an RFID module m accordance with the present invention in perspective view.
Figure 9:
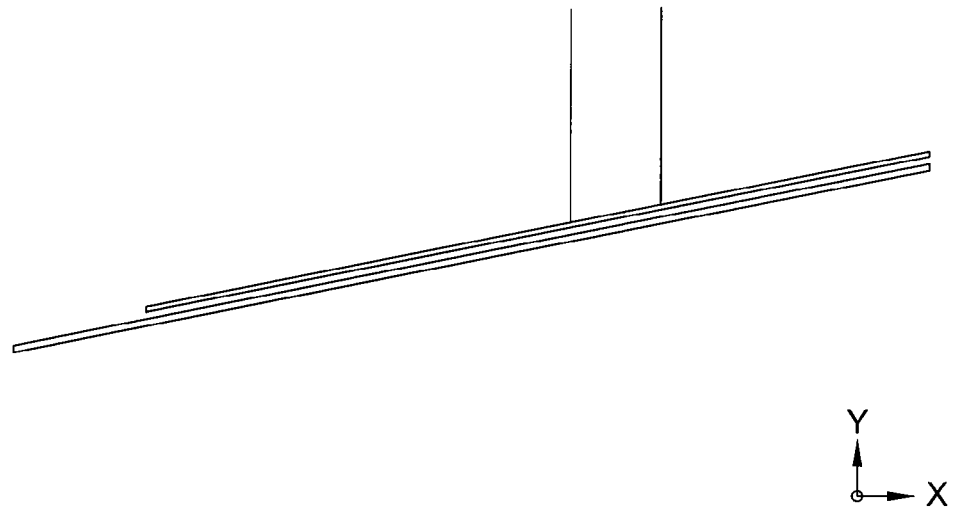
FIG. 9 shows a magnified cross section view of a via structure in accordance with the present invention.
Figure 10:
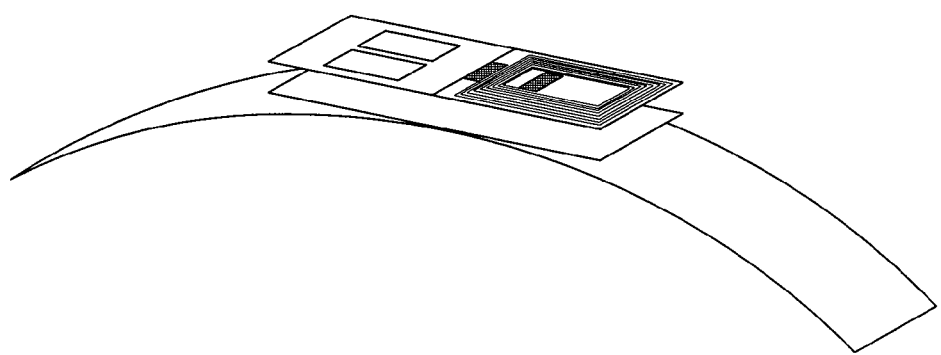
FIG. 10 shows another perspective view of a substantially planar implementation with a dielectric layer in phantom for purposes of illustration.

FIG. 7 and FIG. 8 show substantially completed RFID assemblies 100 having the UHF and HF antenna structures integrated. In the illustrations, the magnetic material 103 is omitted from the UHF chip 101 area, and an alternative HF antenna design having antenna loops 701 formed on only a portion of RFID assembly 100 is shown. Also visible near the area of chip 101 are cutout structures 115 that enable the remaining metallization in the upper UHF antenna structure to implement impedance matching elements.

The UHF antenna structure can be formed of printed copper traces, aluminum, gold, or other conductive materials including alloys which overlay conductive backplane 109. Other UHF antenna structures and topologies may be substituted to meet the needs of particular applications. For example, patch antenna, planar inverted F antenna (PIFA), and the like may be used in particular implementations.

Figure 12:
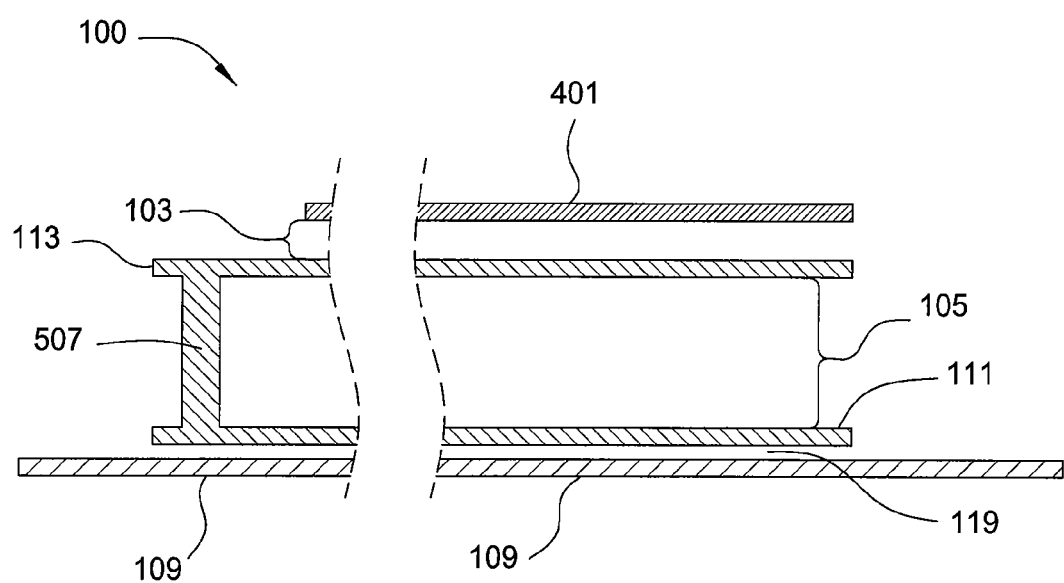
FIG. 12 is a cross-section view of a substantially planar implementation of an RFID module in accordance with the present invention.

FIG. 12 shows an illustrative cross section of RFID assembly 100 to better explain material layers used in embodiments of the present invention. FIG. 12 is for illustrative purposes only and is not actually a cross section through any part of the RFID assembly 100, but schematically provides a vehicle for describing the various material layers used in an exemplary embodiment. The various layers can formed and patterned using thick-fill processing techniques such as printing, patterning, etching, developing and the like. The extended reflector ground layer 109 comprises a conductive foil such as aluminum or other metal that is cut so as to extend sufficiently beyond the lateral boundaries of RFID assembly 100 so as to present a good electrical reflector. An adhesive layer 119 is used to attach the RFID assembly 100 to the reflector ground layer.

UHF bottom-side metallization comprises copper or other conductive material and may cover substantially all of a lower surface of dielectric 105. Vias 507 extend through the thickness of dielectric 105 to couple top side UHF antenna metallization, i.e., upper UHF antenna element 113, to the bottom side UHF antenna metallization, i.e., ower UHF antenna layer 111. The UHF antenna structure provided by the combination of the upper and lower UHF metal, dielectric 105, and vias 507 are covered with a ferrite layer 103. HF metallization, such as copper, is formed on top of the ferrite and patterned to form HF loop antenna structure 401.

In some embodiments of the invention, an RFID assembly is configured with a geometry and materials that allow an HF RFID system and a UHF RFID system to operate in close proximity to a human body and to each other with minimal impact on performance. In addition, the geometry and materials of the RFID assembly are selected to facilitate high-volume manufacture. One such embodiment is illustrated in FIG. 13.

Figure 13:
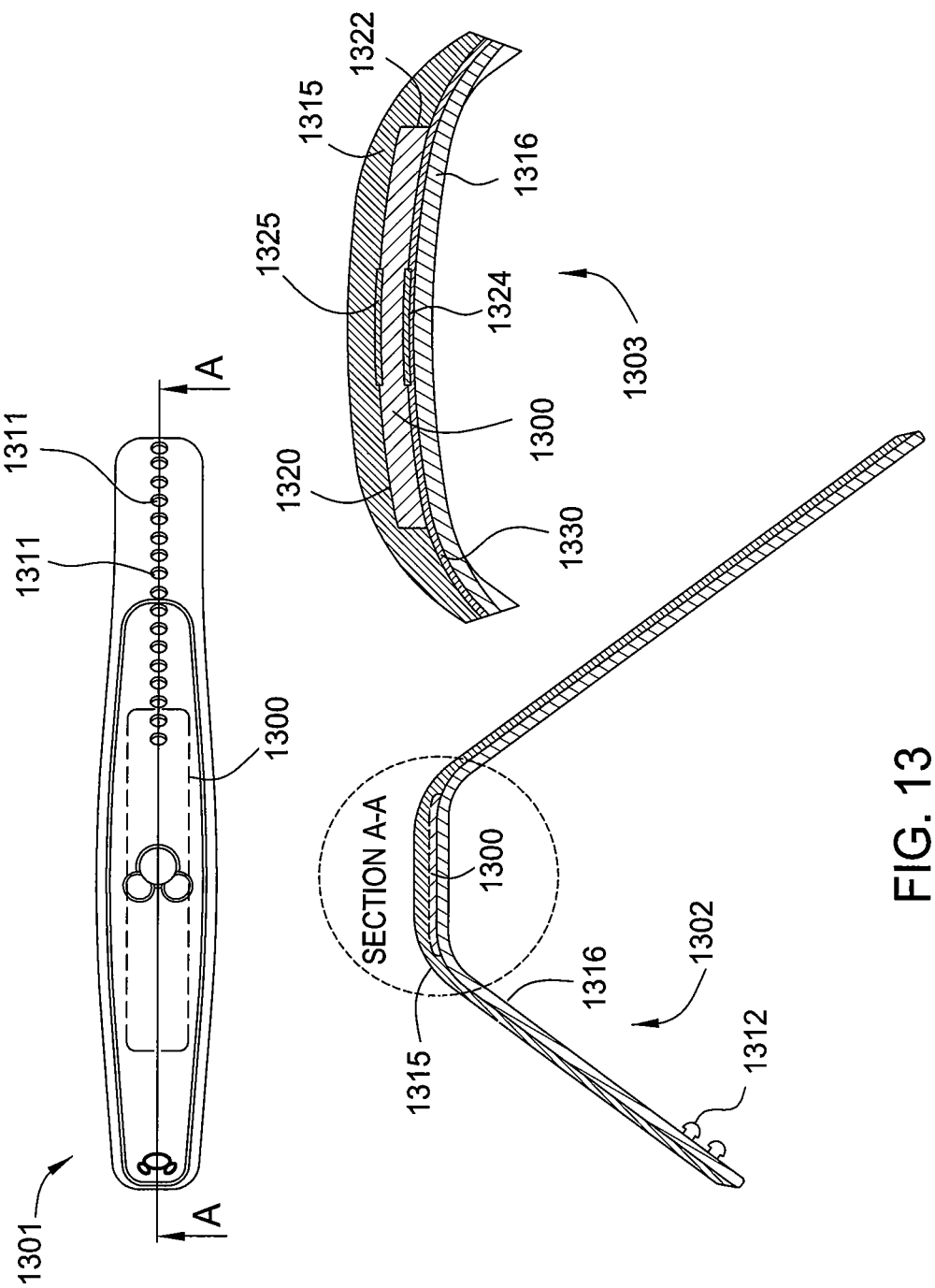
FIG. 13 includes top and cross-sectional views of an RFID assembly incorporated into a wristband, according to embodiments of the invention.

FIG. 13 includes top and cross-sectional views of an RFID assembly 1300 incorporated into a wristband 1310, according to embodiments of the invention. Top view 1301 of wristband 1310 illustrates RFID assembly 1300 positioned in a center region of wristband 1310 and holes 1311 for clasp 1312. Cross-sectional view 1302 is taken at section A-A in top view 1301, and shows clasp 1312 and RFID assembly 1300 enclosed in a top molded cover 1315 and a top bottom cover 1316. Cross-sectional view 1303 is an enlarged view of a portion of wristband 1310 indicated in cross-sectional view 1302. Cross-sectional view 1303 more clearly illustrates RFID assembly 1300 positioned between top molded cover 1315 and bottom molded cover 1316. Also visible in cross-sectional view 1303 are top assembly 1320 and bottom assembly 1330 of RFID assembly 1300. As shown, top assembly 1320 includes a rigid spacer 1322 with a bottom indentation 1324 and a top indentation 1325. Top assembly 1320 and bottom assembly 1330 are described in greater detail below in conjunction with FIG. 14.

Figure 14:
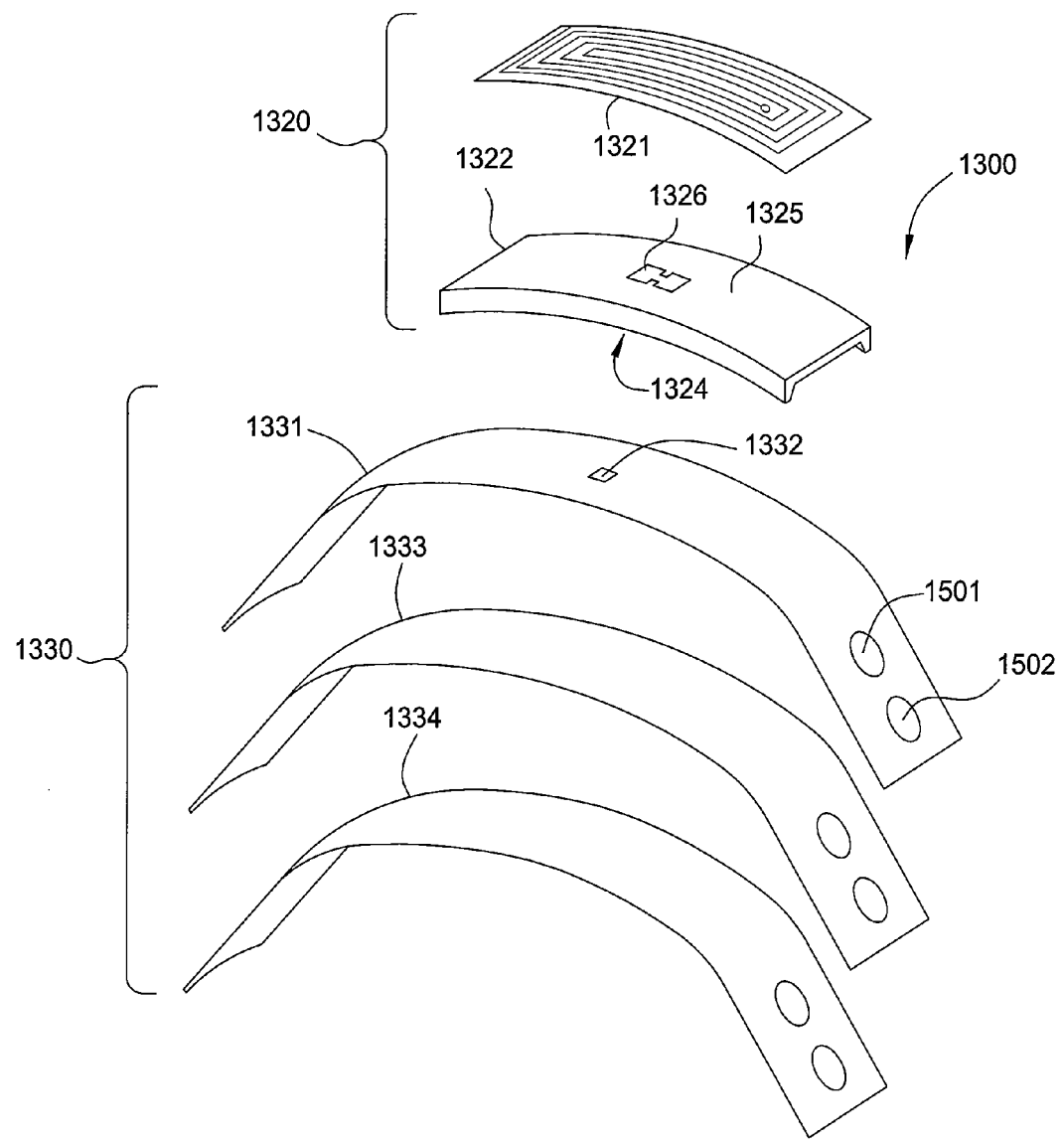
FIG. 14 is an exploded perspective view of the various components of a top assembly and a bottom assembly, according to embodiments of the invention.

FIG. 14 is an exploded perspective view of the various components of top assembly 1320 and bottom assembly 1330, according to embodiments of the invention. Top assembly 1320 includes an HF antenna 1321, rigid spacer 1322, and an HF chip 1326, and bottom assembly 1330 includes a UHF antenna 1331, a UHF chip 1332, a back plane foil 1333, and a protector 1334. As shown, RFID assembly 1300 has a layered configuration that greatly facilitates high-volume manufacture.

HF antenna 1321 is an HF antenna disposed on rigid spacer 1322, and may be formed by any technically feasible method known in the art. In one embodiment, HF antenna 1321 comprises an etched conductor pattern or a silk-screened conductive ink pattern formed directly on rigid spacer 1322. In another embodiment, HF antenna 1321 is an etched conductor pattern or a silk-screened conductive ink pattern formed on an intermediary substrate that is subsequently adhered or molded onto rigid spacer 1322. In such embodiments, HF antenna 1321 may be on the order of 50 to 100 microns in thickness. Thicker configurations of HF antenna 1321 fall within the scope of the invention, but can be undesirable for applications in which compactness of RFID assembly 1300 is a factor. For maximum antenna performance, in one embodiment, HF antenna 1321 comprises a conductive coil, or "racetrack," pattern that substantially covers the surface of rigid spacer 1322.

Rigid spacer 1322 is a structural component of RFID assembly 1300 that provides structural strength and a desired shape to RFID assembly 1300, e.g., curved to accommodate the wrist. In addition, rigid spacer 1322 provides a mounting surface for HF antenna 1321, protects the fragile connection point between HF antenna 1321 and HF chip 1326, and protects HF chip 1326 and UHF chip 1332 during fabrication and use of wristband 1320. For example, during fabrication, a high-temperature, high-pressure molding process may be used to assembly wristband 1310, in which pressures on the order of 8000 psi and temperatures on the order of 200° C. are used. Rigid spacer 1322 can help to protect HF chip 1326 and UHF chip 1332 from being damaged during such a process. Furthermore, rigid spacer 1322 can be configured to separate HF antenna 1321 from UHF antenna 1331, thereby significantly reducing interference, de-tuning, and signal blocking between HF antenna 1321 and UHF antenna 1331. In some embodiments, rigid spacer 1322 is configured to separate HF antenna 1321 from UHF antenna 1331 by approximately 2 mm. In other embodiments, rigid spacer 1322 is configured to separate HF antenna 1321 from UHF antenna 1331 from 1 mm to 5 mm, depending on the application. Rigid spacer 1322 may be configured to provide even greater spacing than 5 mm without exceeding the scope of the invention. However, the benefits of greater spacing than a few millimeters between HF antenna 1321 from UHF antenna 1331 diminish quickly, whereas the bulkiness of wristband 1310 increases with greater inter-antenna spacings.

Rigid spacer 1322 comprises any substantially rigid material that is "RF friendly," i.e., non-RF-absorbing. Due to the separation provided by rigid spacer 1322, adequate performance by the HF and UHF systems of RFID assembly 1300 can be achieved even when rigid spacer 1322 is not a necessarily a high-dielectric material designed to enhance RF performance. In some embodiments, rigid spacer 1322 comprises a polycarbonate plastic, which is compatible with pressure-molding processes that may be used to fabricate wristband 1310 in high volume. Other varieties of substantially rigid plastic may also be used.

HF chip 1326 is an HF RFID chip coupled to HF antenna 1321 and is mounted in top indentation 1325 of rigid spacer 1322. HF chip 1326 may be any HF-technology RFID chip known in the art suitable for the intended application of wristband 1310. UHF chip 1332 is a UHF RFID chip coupled to UHF antenna 1331 and is mounted in bottom indentation 1324 of rigid spacer 1322. UHF chip 1332 may be any UHF-technology RFID chip known in the art suitable for the intended application of wristband 1310.

Figure 15:
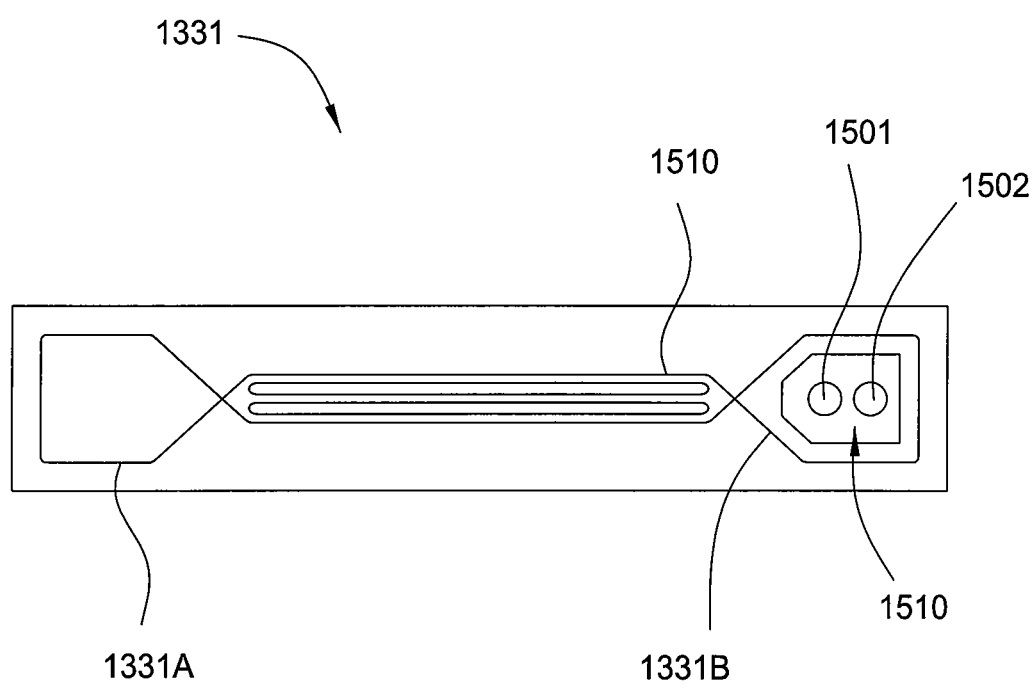
FIG. 15 schematically illustrates an exemplary embodiment of a UHF antenna.

UHF antenna 1331, which is an element of bottom assembly 1330, is a UHF antenna designed to accommodate the space available within the form factor of wristband 1310. In addition, UHF antenna 1331 is configured to have minimal orientation sensitivity, so that a UHF read point can receive sufficient signal from UHF antenna 1331 regardless of orientation. FIG. 15 schematically illustrates an exemplary embodiment of UHF antenna 1331. As shown, in the embodiment illustrated in FIG. 15, UHF antenna 1331 has an elongated configuration compatible with the form factor of wristband 1310. UHF antenna 1331 includes conductive traces 1520 formed on a backing material, such as a flexible substrate, having a thickness on the order of 50 to 100 microns. One suitable material for the backing material of UHF antenna 1331 is a polyethylene terephthalate (PET) film. In some embodiments, the conductive traces of UHF antenna 1331 are formed with a metallic film, such as a copper, silver, or aluminum, and are deposited and etched using photolithography and/or other manufacturing techniques known in the art. In other embodiments, the conductive traces of UHF antenna 1331 comprise a conductive ink deposited via a silk-screen process. Other varieties of conductive traces known in the art may also be used for the conductive traces of UHF antenna 1331 without exceeding the scope of the invention. The conductive traces of UHF antenna 1331 include paddles 1331A, 1331B, which can have an off-the-shelf configuration. In some embodiments, paddles 1331A, 1331B may be designed with a shape and thickness for a specific application to minimize orientation sensitivity of RFID assembly 1300. As shown in FIG. 15, UHF antenna 1331 includes an opening 1510 formed in paddle 1331B to accommodate holes 1501, 1502. Holes 1501, 1502 are formed in the backing material of UHF antenna 1331 and allow insertion of the studs of clasp 1312.

Referring back to FIG. 14, bottom assembly 1330 further includes back plane foil 1333, and an optional protector layer 1334. Backplane foil 1333, similar to conductive metal backplane 109 in FIG. 1, improves performance, particularly of UHF antenna 1331. Backplane foil 1333 reflects incident electric field energy and improves variance inherent in having RFID assembly 1300 in close proximity to an absorbing body such as a human being. In some embodiments, backplane foil 1333 comprises a metallic foil adhered to a substrate, such as a flexible polypropylene film. In order to minimize thickness of wristband 1310, backplane foil 1333 is generally selected to be as thin as possible, e.g., less than 200 microns. However, one of skill in the art will appreciate that when backplane foil 1333 is too thin, assembly of wristband 1310 can be problematic due to damage suffered by backplane foil 1333 during high-temperature processes associated therewith. Consequently, in a preferred embodiment, backplane foil is no thinner than about 100 microns.

In some embodiments, bottom assembly 1330 includes protector layer 1334, which can act as an additional barrier to heat and shear forces of the injection-molding and other fabrication processes. Thus, the presence of protector layer 1334 helps prevent backplane foil 1333 from wrinkling during assembly. Protector layer 1334 comprises any RF-friendly material compatible with the injection-molding process or other processes associated with fabricating wristband 1310. In some embodiments, protector layer 1334 is comprised of polytetrafluoroethylene (PTFE) or nylon. In order to minimize thickness of wristband 1310, protector layer 1334 is generally selected to be as thin as practicable and still provide thermal protection and positional support during fabrication. In one embodiment, protector layer 1334 is less than 300 microns in thickness.

The layered configuration of bottom assembly 1330 can be assembled in an automated or manual process. In some embodiments, each adjacent element of wristband 1310 can be adhered to each other manually. In other embodiments, bottom assembly 1330 can be fabricated by sandwiching together a roll of backplane foil 133 material and a roll of prefabricated UHF antennas 1331.

In some embodiments of the invention, a UHF antenna is not made a part of bottom assembly 1330, and is instead incorporated into top assembly 1320. Because a long-length UHF antenna cannot be used in such an embodiment, a multi-layer antenna is used. One such embodiment is illustrated in FIG. 16.

Figure 16:
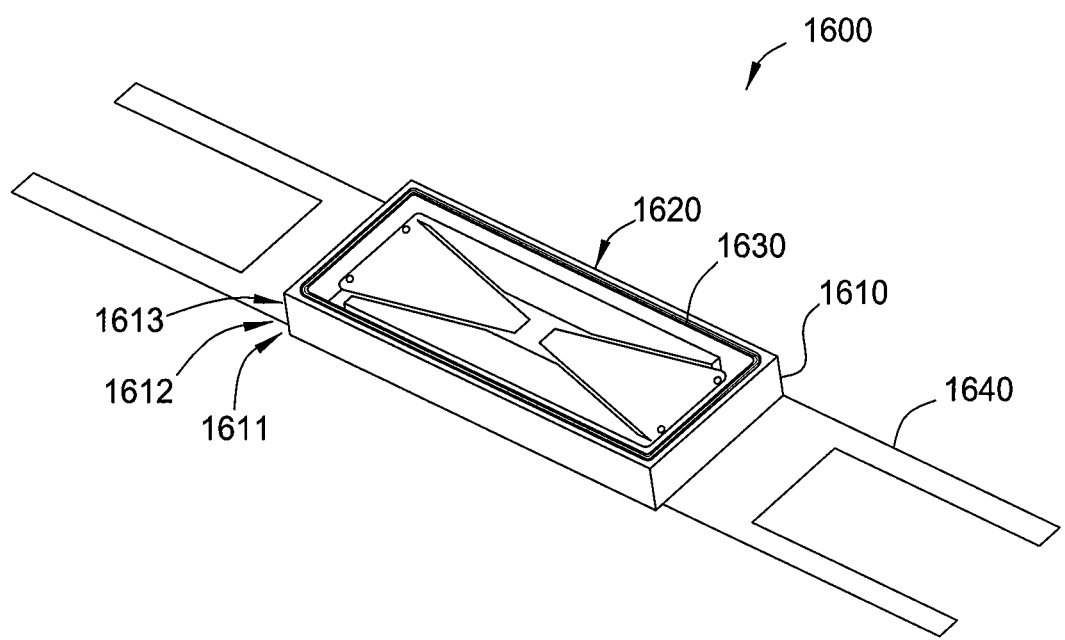
FIG. 16 schematically illustrates a perspective view of an RFID assembly, according to embodiments of the invention.
Figure 16:
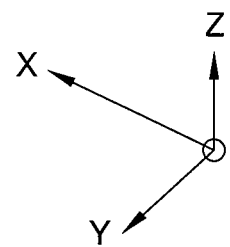
Figure 18:
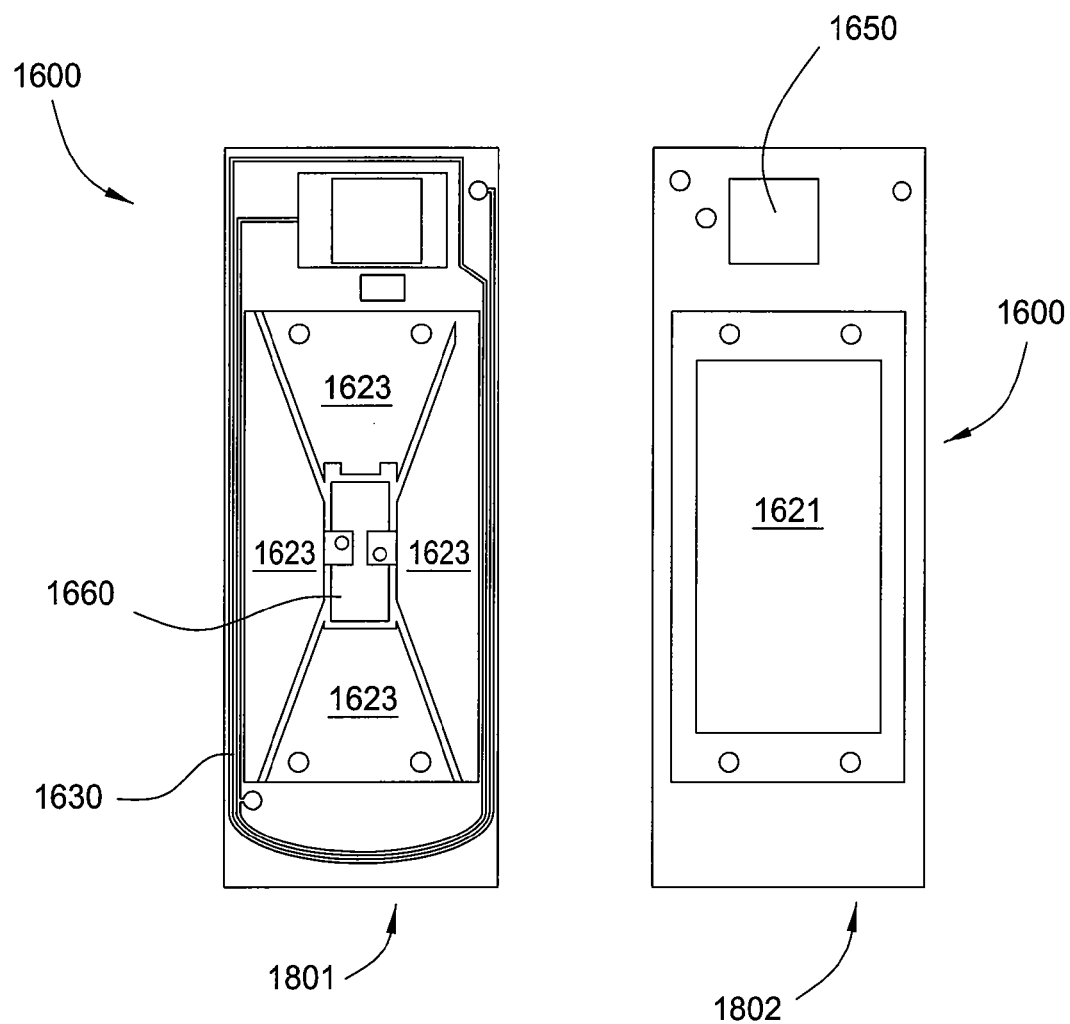
FIG. 18 includes a top view and a bottom view of an RFID assembly 1600, according to embodiments of the invention.

FIG. 16 schematically illustrates a perspective view of an RFID assembly 1600, according to embodiments of the invention. RFID assembly 1600 is configured with a tri-planar geometry and specific materials that allow an HF system and a UHF system to operate in close proximity to a human body and to each other with minimal impact on performance. In addition, the geometry and materials of the RFID assembly are selected to facilitate high-volume manufacture. In the embodiment illustrated in FIG. 16, RFID assembly 1600 can be incorporated into wristband 1310 in FIG. 13 in lieu of RFID assembly 1300. Thus, RFID assembly 1600 can be bonded to protector 134 (when used), and then be molded inside top molded cover 1315 and top bottom cover 1316 to form wristband 1310. RFID assembly 1600 includes a high-dielectric ceramic core 1610, a UHF antenna 1620, an HF antenna 1630, a back plane foil 1640, an HF chip 1650 and a UHF chip 1660. HF chip 1650 and UHF chip 1660 are illustrated in FIG. 18.

High-dielectric ceramic core 1610 includes three high-dielectric ceramic layers 1611-1613 that are adhered together to form a single component. High-dielectric ceramic layers 1611-1613 are illustrated separately and described below in conjunction with FIGS. 17A-17C. The material of high-dielectric ceramic core 1610 is selected to enhance the performance of UHF antenna 1620 and UHF chip 1660. Each of high-dielectric ceramic layers 1611-1613 includes a component of UHF antenna 1620 formed thereon. In addition, HF antenna 1630 is formed on high-dielectric ceramic layer 1613. In some embodiments, high-dielectric ceramic core 1610 is a laminated structure that is assembled using a conventional printed circuit board (PCB) assembly process. In other embodiments, high-dielectric ceramic layers 1611-1613 are adhered together to form high-dielectric ceramic core 1610.

In some embodiments, the material used for high-dielectric layers 1611-1613 is an electroceramic material. Electroceramics is a class of ceramic materials used primarily for their electrical properties, and are widely used for radio frequency (RF) applications. Numerous electroceramics are known in the art that have the mechanical stability and electrical characteristics suitable for use as the multiple layers in high-dielectric ceramic core 1610. In some embodiments, high-dielectric layers 1611-1613 are formed from different electroceramic materials, so that different dielectric constants can be used for different layers of high-dielectric ceramic core 1610. Examples of electroceramic materials suitable for use as one or more of high-dielectric layers 1611-1613 include titanates; e.g., zirconium barium titanate, strontium titanate, calcium titanate, magnesium titanate, calcium magnesium titanate, zinc titanate, lanthanum titanate, and neodymium titanate; zirconates, e.g., barium zirconate and calcium zirconate; niobates, e.g., lead magnesium niobate, lead zinc niobate, and lithium niobate; and the like. One of skill in the art, upon reading the disclosure provided herein, can readily select suitable electroceramic materials for high-dielectric layers 1611-1613.

Back plane foil 1640 is substantially similar in composition to backplane foil 1333 in FIG. 14, and is used to improve performance of UHF antenna 1620. In some embodiments, backplane foil 1640 has a significantly smaller "footprint" than backplane foil 1333, since a long-length UHF antenna is not used in RFID assembly 1600 and there is no benefit for backplane foil 1640 to extend a significant distance from high-dielectric ceramic core 1610.

Figure 17A:
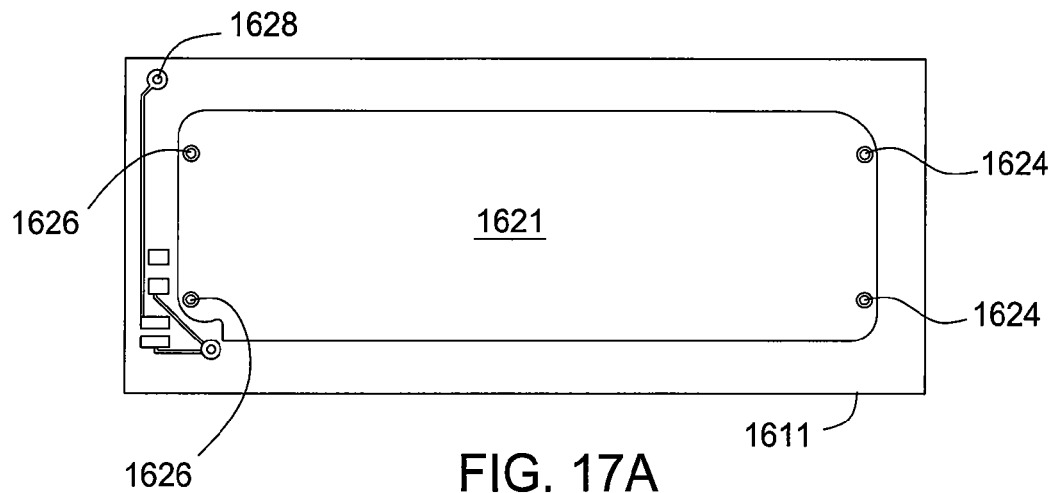
FIGS. 17A-17C illustrate schematic plan views of high-dielectric ceramic layers, according to embodiments of the invention.
Figure 17B:
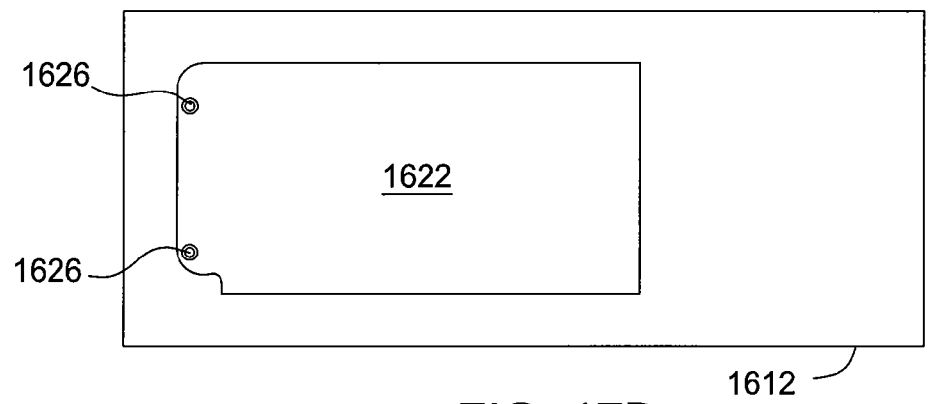
Figure 17C:
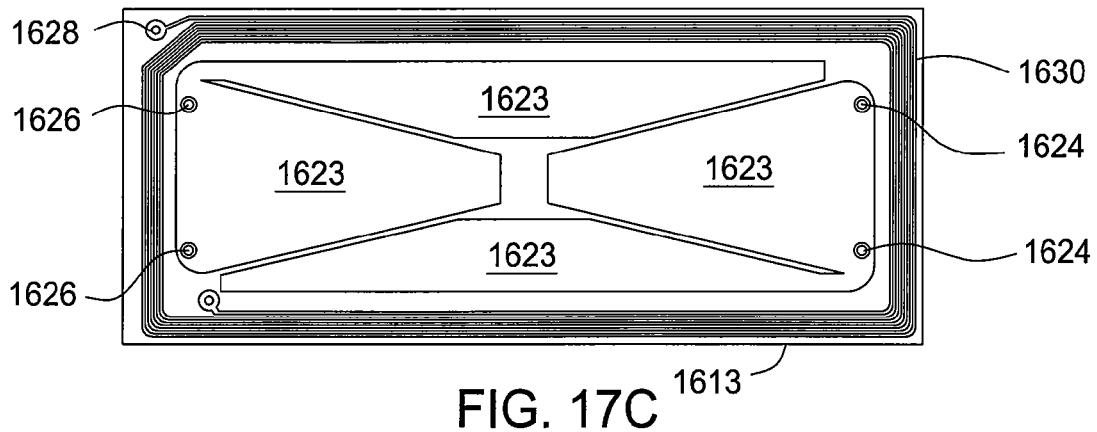

FIGS. 17A-17C illustrate schematic plan views of high-dielectric ceramic layers 1611-1613, respectively, according to embodiments of the invention. FIG. 17A illustrates high-dielectric ceramic layer 1611, which serves as the bottom circuit layer for RFID assembly 1600 and includes a bottom UHF antenna component 1621. High-dielectric ceramic layer 1611 also includes vias 1624 and vias 1626. Vias 1624 electrically couple bottom UHF antenna component 1621 with a top bottom UHF antenna component 1623 (shown in FIG. 17C), and vias 1626 electrically couple bottom UHF antenna component 1621 with top UHF antenna component 1623 and a center UHF antenna component 1622 (shown in FIG. 17B). FIG. 17B illustrates high-dielectric ceramic layer 1612, which serves as the middle circuit layer for RFID assembly 1600 and includes center UHF antenna component 1622. FIG. 17C illustrates high-dielectric ceramic layer 1613, which serves as the top circuit layer for RFID assembly 1600 and includes top UHF antenna component 1623. Thus, UHF antenna 1630 is a tri-planar antenna that includes multiple planar antennas, i.e., bottom UHF antenna component 1621, center UHF antenna component 1622, and top UHF antenna component 1623. Consequently, UHF antenna 1630 has a high surface area disposed in a relatively small form factor.

As shown in FIG. 17A, high-dielectric ceramic layer 1613 also includes HF antenna 1630. HF antenna 1630 is formed around the periphery of high-dielectric ceramic layer 1613 and is connected to high-dielectric ceramic layer 1611 with a via 1628 for connection to HF chip 1650 (illustrated in FIG. 18). It is noted that in RFID assembly 1600, HF antenna 1630 only includes a narrow racetrack pattern covering a relatively small portion of the total surface area of high-dielectric ceramic layer 1613. This is in contrast to HF antenna 1321 of RFID assembly 1300 in FIG. 14, which covers a significantly larger surface area. Such a configuration of HF antenna 1630 reduces the performance of HF antenna 1630 and HF chip 1650, but provides for an expanded and more three-dimensional structure for UHF antenna 1620, thereby greatly improving the performance and orientation sensitivity of UHF antenna 1620 and UHF chip 1660. Specifically, the three-dimensional structure of UHF antenna 1620 provides substantially less orientation-sensitive performance in sending and receiving UHF signals.

FIG. 18 includes a top view 1801 and a bottom view 1802 of RFID assembly 1600, according to embodiments of the invention. In the embodiment illustrated in FIG. 18, HF chip 1650 is disposed on a bottom surface of high-dielectric ceramic layer 1611 and UHF chip 1660 is disposed on an upper surface of high-dielectric ceramic layer 1613. In other embodiments, HF chip 1650 and UHF chip 1660 may be located in other positions in high-dielectric ceramic core 1610 or on a surface thereof.

During the manufacturing process, conductive traces making up UHF antenna 1620 and HF antenna 1630 are formed on the individual high-dielectric ceramic layers 1611-1613 illustrated in FIGS. 17A-17C using metallic foil, silk-screening of conductive ink, or any other technically feasible technique known in the art for applying conductive traces to a ceramic surface. After UHF antenna 1620 and HF antenna 1630 are formed on the individual high-dielectric ceramic layers 1611-1613, high-dielectric ceramic layers 1611-1613 are bonded together and electrical connections between high-dielectric ceramic layers 1611-1613 are completed. In one embodiment, high-dielectric ceramic layers 1611-1613 are bonded together using a PCB assembly process and electrical connections therebetween, i.e., inter-layer vias 1624, 1626, and 1628, are completed using conductor deposition techniques known in the art, such as plating, soldering, and the like. Alternatively, high-dielectric ceramic layers 1611-1613 may be assembled by being adhered together while held in place with retaining clips, and compressed.

While embodiments of the invention described herein are described in terms of an RFID assembly incorporated into a wristband, an RFID assembly can be configured as any technically feasible wearable device without exceeding the scope of the invention, such as a pendant, badge, etc.

In sum, embodiments of the invention provide a wearable device that includes an HF or "near-field," RFID system and a UHF, or "far-field," RFID system that each operate with minimal interference therebetween. The HF RFID system allows secure, transactional activities to be performed due to the close proximity required for data transfer therewith; an explicit action on the part of the wearer is required to initiate a transaction, for example tapping wristband 1310 on a reader device. Simultaneously, the UHF RFID system allows the detection of the proximity and identity of the wearer in a relatively large volume, which facilitates interactive and personalized entertainment experiences, as well as capturing metrics associated with wearers of wristband 1310, such head count and other location and behavior tracking information.

While the foregoing is directed to embodiments of the present invention, other and further embodiments of the invention may be devised without departing from the basic scope thereof, and the scope thereof is determined by the claims that follow.

We claim:

1. A radio frequency identification device configured to be worn on a human appendage, comprising:
    an antenna structure of a first type, wherein the antenna structure of the first type is multi-planar;
    an antenna structure of a second type;
    a first dielectric layer configured to electrically isolate the antenna structure of the first type from the antenna structure of the second type; and
    a reflective shield disposed relative to the antenna structures of the first and second types such that interference between the human appendage and the antenna structures of the first and second types is reduced during operation.

2. The radio frequency identification device of claim 1, wherein the antenna structure of the first type is bi-planar.

3. The radio frequency identification device of claim 2, further comprising a layer of material that absorbs magnetic energy disposed between the antenna structure of the second type and a planar portion of the antenna structure of the first type.

4. The radio frequency identification device of claim 3, wherein the antenna structure of the first type comprises an ultra-high frequency antenna, and the antenna structure of the second type comprises a high frequency antenna, and wherein the layer of material that absorbs magnetic energy is configured to isolate the planar portion of the ultra-high frequency antenna from the magnetic field of the high frequency antenna.

5. The radio frequency identification device of claim 2, wherein the antenna structure of the first type comprises a first planar portion, a second planar portion, and a conductive portion that connects a first end of the first planar portion to a first end of the second planar portion to increase the effective electrical length of the antenna structure of the first type.

6. The radio frequency identification device of claim 1, wherein the antenna structure of the first type is tri-planar.

7. The radio frequency identification device of claim 6, further comprising a second dielectric layer, wherein each planar portion of the antenna structure of the first type is formed on a different sub-layer of the second dielectric layer.

8. The radio frequency identification device of claim 7, wherein each planar portion of the antenna structure of the first type is formed from a conductive ink.

9. The radio frequency identification device of claim 7, wherein each sub-layer of the second dielectric layer comprises an electroceramic material.

10. The radio frequency identification device of claim 7, wherein a first planar portion of the antenna structure of the first type is disposed within the antenna structure of the second type.

11. The radio frequency identification device of claim 10, wherein the antenna structure of the first type comprises an ultra-high frequency antenna, and the antenna structure of the second type comprises a high frequency antenna, and wherein the first planar portion of the ultra-high frequency antenna and the high frequency antenna are both disposed on the same sub-layer of the second dielectric layer.

12. The radio frequency identification device of claim 6, wherein the antenna structure of the first type comprises a first planar portion, a second planar portion, a third planar portion, a first conductive via that connects a first end of the first planar portion to a first end of the second planar portion, and a second conductive via that connects the first end of the second planar portion to a first end of the third planar portion to increase the effective surface area of the antenna structure of the first type.

13. The radio frequency identification device of claim 1, wherein the antenna structure of the first type and the antenna structure of the second type are single-planar.

14. The radio frequency identification device of claim 13, wherein the antenna structure of the first type comprises an ultra-high frequency antenna that is a dipole antenna formed on a flexible substrate.

15. The radio frequency identification device of claim 13, wherein the dielectric layer comprises a spacer that separates the antenna structure of the first type and the antenna structure of the second type.

16. The radio frequency identification device of claim 13, the antenna structure of the first type is formed from a conductive ink.

17. The radio frequency identification device of claim 1, wherein the antenna structure of the first type comprises an ultra-high frequency antenna, and the antenna structure of the second type comprises a high frequency antenna, and further comprising an ultra-high frequency radio frequency identification chip coupled to the ultra-high frequency antenna, and a high frequency radio frequency identification chip coupled to the high frequency antenna.

18. A radio frequency identification device configured to be worn on a human appendage, comprising:
   an antenna structure of a first type;
   an antenna structure of a second type, wherein the antenna structure of the first type and the antenna structure of the second type are single-planar;
   a dielectric layer configured to electrically isolate the antenna structure of the first type from the antenna structure of the second type, wherein the dielectric layer comprises a spacer that separates the antenna structure of the first type and the antenna structure of the second type, and wherein the dielectric layer is formed with a cavity in which at least one radio frequency identification chip is disposed; and
   a reflective shield disposed relative to the antenna structures of the first and second types such that interference between the human appendage and the antenna structures of the first and second types is reduced during operation.

19. A radio frequency identification device configured to be worn on a human appendage, comprising:
   an antenna structure of a first type;
   an antenna structure of a second type, wherein the antenna structure of the first type and the antenna structure of the second type are single-planar;
   a dielectric layer configured to electrically isolate the antenna structure of the first type from the antenna structure of the second type; and
   a reflective shield disposed relative to the antenna structures of the first and second types such that interference between the human appendage and the antenna structures of the first and second types is reduced during operation, wherein the antenna structure of the second type is disposed on the dielectric layer, and the antenna structure of the first type is disposed between the dielectric layer and the reflective shield.

* * * * *